United States Patent
Kim et al.

(10) Patent No.: US 10,133,938 B2
(45) Date of Patent: Nov. 20, 2018

(54) APPARATUS AND METHOD FOR OBJECT RECOGNITION AND FOR TRAINING OBJECT RECOGNITION MODEL

(71) Applicant: Samsung Electronics Co., Ltd., Suwon-si (KR)

(72) Inventors: Chang Hyun Kim, Seongnam-si (KR); Tae Sup Moon, Seoul (KR); Dong Hwa Lee, Hwaseong-si (KR); Hyun Jin Choi, Seoul (KR); Ki Hwan Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 15/266,231

(22) Filed: Sep. 15, 2016

(65) Prior Publication Data

US 2017/0083772 A1 Mar. 23, 2017

(30) Foreign Application Priority Data

Sep. 18, 2015 (KR) .................. 10-2015-0132625

(51) Int. Cl.
*G06K 9/00* (2006.01)
*G06K 9/62* (2006.01)
(Continued)

(52) U.S. Cl.
CPC ............ *G06K 9/00791* (2013.01); *B60C 9/00* (2013.01); *G06K 9/4642* (2013.01);
(Continued)

(58) Field of Classification Search
CPC ............ G06K 9/00791; G06K 9/6226; G06K 9/6223; G06K 9/4642; G06K 9/72;
(Continued)

(56) References Cited

U.S. PATENT DOCUMENTS 7,952,490 B2  3/2011  Fechner et al.
8,917,327 B1*  12/2014  Bishay ................... H04N 9/045
                                                      348/219.1
(Continued)

FOREIGN PATENT DOCUMENTS

JP    2013-171390 A    9/2013
JP    2014-78056 A     5/2014
(Continued)

OTHER PUBLICATIONS

Koltun, Vladlen. "Efficient Inference in Fully Connected CRFs with Gaussian Edge Potentials." Adv. Neural Inf. Process. Syst (2011). (9 pages in English).
(Continued)

*Primary Examiner* — Gregory F Cunningham
(74) *Attorney, Agent, or Firm* — NSIP Law

(57) ABSTRACT

Disclosed are methods and apparatuses for object recognition using an artificial neural network. An object recognition apparatus includes an adjacent pixel setter configured to set the neighboring pixel pairs in the image frame, each neighboring pixel pair including first pixel and one or more second pixels adjacent to the first pixel, a labeler configured to label the first pixel using deep neural network-based model based on probability density function value of the neighboring pixel pairs, and an object recognizer configured to recognize an object based on the labeled first pixel.

15 Claims, 9 Drawing Sheets

(51) Int. Cl.
*B60C 9/00* (2006.01)
*G06N 3/04* (2006.01)
*G06N 3/08* (2006.01)
*G06N 7/00* (2006.01)
*G06K 9/46* (2006.01)
*G06K 9/72* (2006.01)

(52) U.S. Cl.
CPC ......... *G06K 9/6223* (2013.01); *G06K 9/6226* (2013.01); *G06K 9/72* (2013.01); *G06N 3/0445* (2013.01); *G06N 3/08* (2013.01); *G06N 7/005* (2013.01)

(58) Field of Classification Search
CPC .......... B60Q 9/00; G06N 3/0445; G06N 3/08; G06N 7/005
USPC ....................................................... 382/103
See application file for complete search history.

(56) References Cited

U.S. PATENT DOCUMENTS

| | | | |
|---|---|---|---|
| 9,007,197 | B2 | 4/2015 | Breed |
| 9,653,093 | B1* | 5/2017 | Matsoukas ............... G10L 15/08 |
| 2007/0252035 | A1 | 11/2007 | Hubbard, Jr. |
| 2012/0069185 | A1 | 3/2012 | Stein |
| 2012/0314071 | A1 | 12/2012 | Rosenbaum et al. |
| 2013/0325202 | A1 | 12/2013 | Howard et al. |
| 2014/0240502 | A1 | 8/2014 | Strauss et al. |
| 2014/0340518 | A1 | 11/2014 | Kambe et al. |
| 2015/0086080 | A1 | 3/2015 | Stein et al. |
| 2015/0103184 | A1 | 4/2015 | Tracey et al. |

FOREIGN PATENT DOCUMENTS

| | | |
|---|---|---|
| JP | 5581796 B2 | 7/2014 |
| KR | 10-2013-0085235 A | 7/2013 |
| KR | 10-1417522 B1 | 8/2014 |
| KR | 10-1511858 B1 | 4/2015 |
| KR | 10-1519215 B1 | 5/2015 |

OTHER PUBLICATIONS

Zheng, Shuai, et al. "Conditional random fields as recurrent neural networks." Proceedings of the IEEE International Conference on Computer Vision. 2015.

Papandreou, George, et al. "Weakly-and semi-supervised learning of a deep convolutional network for semantic image segmentation." Proceedings of the IEEE International Conference on Computer Vision. 2015.

* cited by examiner

FIG. 4

| Case | Sub Case | $\Delta E$ |
|---|---|---|
| $l_i = l_j$ | N/A | $\sum_i \left[ -1 + P_i(x = l_i) - \lambda P_i(x = l_i)(1 - P_i(x = l_i)) \sum_{j \neq i} \log P_j(x = l_i) \right]$ |
| $l_i \neq l_j$ | $\alpha > D_{KL}(P_i \| P_j)$ | $\sum_i \left[ -1 + P_i(x = l_i) + \lambda \left[ \sum_{j \neq i} \left\{ -\log \left( \frac{P_i(x = l_i)}{P_j(x = l_i)} \right) + 1 \right\} \right] P_i(x = l_i)(1 - P_i(x = l_i)) \right]$ |
| | $\alpha \leq D_{KL}(P_i \| P_j)$ | $-1 + P_i(x = l_i)$ |

FIG. 5

| | $j_{\{i(2,1),1\}}$ | $j_{\{i(2,1),2\}}$ | $j_{\{i(2,1),3\}}$ | | |
|---|---|---|---|---|---|
| | $j_{\{i(1,1),1\}}$<br>$i(2,1)$ | $j_{\{i(1,1),2\}}$<br>$i(2,2)$<br>$j_{\{i(2,1),4\}}$ | $j_{\{i(1,1),3\}}$<br>$i(2,3)$ | Layer 1 : 8 pixels around $i(1,1)$ | |
| $j_{\{i(2,1),8\}}$ | $j_{\{i(1,1),8\}}$<br>$i(2,8)$<br>$j_{\{i(2,1),6\}}$ | $i(1,1)$<br>$j_{\{i(2,1),5\}}$ | $j_{\{i(1,1),4\}}$<br>$i(2,4)$ | | |
| $j_{\{i(2,1),7\}}$ | $j_{\{i(1,1),7\}}$<br>$i(2,7)$ | $j_{\{i(1,1),6\}}$<br>$i(2,6)$ | $j_{\{i(1,1),5\}}$<br>$i(2,5)$ | | |
| | | | | | |

LAYER 2: TOTAL OF 64 PIXELS, 8 PIXELS AROUND $i(2,1)$ AND 8 PIXELS AROUND EACH OF $i(2,2) - i(2,8)$

APPARATUS AND METHOD FOR OBJECT RECOGNITION AND FOR TRAINING OBJECT RECOGNITION MODEL

CROSS-REFERENCE TO RELATED APPLICATION(S)

This application claims the benefit under 35 U.S.C. § 119(a) of Korean Patent Application No. 10-2015-0132625, filed on Sep. 18, 2015, in the Korean Intellectual Property Office, the entire disclosure of which is incorporated herein by reference for all purposes.

BACKGROUND

1. Field

The following description relates to object recognition using an artificial neuron network.

2. Description of Related Art

In order to recognize an object, RGB data from camera sensors may be received, and handcrafted features may be extracted from the data to perform image processing. If the image processing depends only on the handcrafted features extracted from the image data obtained by the camera, the accuracy of recognition may be sensitive to changes in weather or illuminance. In some circumstances, even object recognition may not be possible, such as, for example, when driving on an unpaved road or in traffic congestion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an object recognition apparatus including a processor configured to set neighboring pixel pairs in an image frame, each neighboring pixel pair including a first pixel and one or more second pixels adjacent to the first pixel, label the first pixel using a deep neural network-based model based on a probability density function value of the neighboring pixel pairs, and recognize an object based on the labeled first pixel.

The processor may include an adjacent pixel setter configured to set the neighboring pixel pairs in the image frame, the each neighboring pixel pair including the first pixel and the one or more second pixels adjacent to the first pixel, a labeler configured to label the first pixel using the deep neural network-based model based on the probability density function value of the neighboring pixel pairs, and an object recognizer configured to recognize the object based on the labeled first pixel.

The one or more second pixels may be 8 pixels adjacent to the first pixel, and the neighboring pixel pairs may be 8 pixel pairs, each including the first pixel and one of the 8 second pixels.

The adjacent pixel setter may be configured to set the neighboring pixel pairs on a k-layer according to a degree of proximity (k) between each pixel and the first pixel.

The k may be a constant.

The deep neural network-based model may include any one or any combination of a convolutional neural network (CNN) model that uses spatial information and a recurrent deep neural network (RDNN) model that uses time information.

The pixel labeler may be configured to label the first pixel using a pair-wise function, and the pair-wise function indicates a difference in entropy between pixels in the neighboring pixel pairs that occurs when a second pixel of the one or more second pixels is used to estimate a probability density function value of the first pixel.

The pixel labeler may be configured to calculate the pair-wise function using Kullback-Leibler divergence (KL-divergence).

The object recognizer may be configured to recognize first pixels labeled with a same label as an object of a class.

The processor may include a clusterer configured to cluster first pixels with a same label into a group, and to represent the group as a cluster box, wherein the cluster box indicates a boundary between different objects.

The object recognition apparatus may include a memory configured to store instructions, and wherein the processor may be configured to execute the instructions to set the neighboring pixel pairs in the image frame, the each neighboring pixel pair including the first pixel and the one or more second pixels adjacent to the first pixel, label the first pixel using the deep neural network-based model based on the probability density function value of the neighboring pixel pairs, and recognize the object based on the labeled first pixel.

In another general aspect, there is provided an object recognition model training apparatus including an adjacent pixel setter configured to set neighboring pixel pairs in an image frame, each pair including one first pixel and one or more second pixels adjacent to the first pixel, a pixel labeler configured to label the first pixel based on a probability density function value of the neighboring pixel pairs, a cost function calculator configured to calculate a cost function using a difference in entropy between the first pixel and the neighboring pixel pairs, in response to labeling of each pixel in the image frame being completed, and a trainer configured to train a deep neural network-based object recognition model based on the calculated cost function.

The deep neural network-based model may include any one or any combination of a convolutional neural network (CNN) model that uses spatial information and a recurrent deep neural network (RDNN) model that uses time information.

The pixel labeler may be configured to label the first pixel using the deep neural network-based model using a pair-wise function, wherein the pair-wise function may indicate a difference in entropy between pixels in the neighboring pixel pairs when a second pixel of the one or more is used to estimate a probability density function value of the first pixel.

The pixel labeler may be configured to calculate the pair-wise function using Kullback-Leibler divergence (KL-divergence).

The cost function may indicate a difference between the label of the first pixel and a ground truth label.

The cost function calculator may be configured to calculate the cost function by summing up entropy of an observation probability of the first pixel and the pair-wise function.

The cost function calculator may be configured to identify the pair-wise function as cross entropy (CE) of the first pixel and the second pixel, in response to the label of the first pixel being identical with a label of the second pixel.

The cost function calculator may be configured to determine that a minimum value of the pair-wise function to be 0, in response to the pair-wise function being equal to or smaller than a threshold.

The trainer may be configured to set parameters that minimize the cost function, and to train the deep neural network-based model using the parameters.

In another general aspect, there is provided an object recognition method including setting neighboring pixel pairs l in an image frame, each neighboring pixel pair including a first pixel and one or more second pixels adjacent to the first pixel, labeling the first pixel using a deep neural network-based model based on a probability density function value of the neighboring pixel pairs, and recognizing an object based on the labeled first pixel.

The setting of the neighboring pixel pairs may include setting the neighboring pixel pairs on a k-layer according to a degree of proximity (k) between each pixel and the first pixel.

The first pixel may be labeled using a pair-wise function, and the pair-wise function may indicate a difference in entropy between pixels in the neighboring pixel pairs that occurs when a second pixel of the one or more second pixels is used to estimate a probability density function value of the first pixel.

The labeling of the first pixel may include calculating the pair-wise function using Kullback-Leibler divergence (KL-divergence).

In another general aspect, there is provided an object recognition model training method including setting neighboring pixel pairs in an image frame, each pair including one first pixel and one or more second pixels adjacent to the first pixel, calculating a cost function using a difference in entropy between the first pixel and the neighboring pixel pairs, in response to labeling of each pixel in the image frame being completed, and training a deep neural network-based object recognition model based on the calculated cost function.

The labeling of the each pixel in the image frame may include labeling the first pixel using the deep neural network-based model using a pair-wise function, wherein the pair-wise function may indicate a difference in entropy between pixels in the neighboring pixel pairs when a second pixel of the one or more second pixels is used to estimate a probability density function value of the first pixel.

The labeling of the first pixel may include calculating the pair-wise function using KL-divergence.

The calculating of the cost function may include calculating the cost function by summing up entropy of an observation probability of the first pixel and the pair-wise function.

The calculating of the cost function may include defining the pair-wise function as cross entropy (CE) of the first pixel and the second pixel, in response to the label of the first pixel being identical with a label of the second pixel.

The calculating of the cost function may include determining that a minimum value of the pair-wise function to be 0, in response to the pair-wise function being equal to or smaller than a threshold.

In another general aspect, there is provided a driver assistance apparatus including a camera configured to capture an image, a sensor interface configured to receive the captured image from the camera, a memory configured to store instructions, and a processor configured to execute the instructions to set neighboring pixel pairs in an image frame of the captured image, each neighboring pixel pair including a first pixel and one or more second pixels adjacent to the first pixel, to label the first pixel using a deep neural network-based model based on a probability density function value of the neighboring pixel pairs, and to recognize an object based on the labeled first pixel, and a vehicle control interface configured to transmit the recognized object to an autonomous cruise control module.

Other features and aspects will be apparent from the following detailed description, the drawings, and the claims.

BRIEF DESCRIPTION OF THE DRAWINGS

FIG. 4 is a table showing an example of a calculation of a cost function.

FIG. 5 is a diagram illustrating an example of a neighboring pixel pair and layers.

Figure 1A:
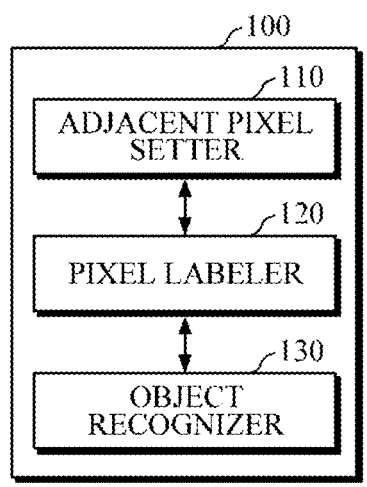
FIG. 1A is a diagram illustrating an example of an object recognition apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or apparatuses described herein. However, various changes, modifications, and equivalents of the methods, apparatuses, and/or apparatuses described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

Figure 1B:
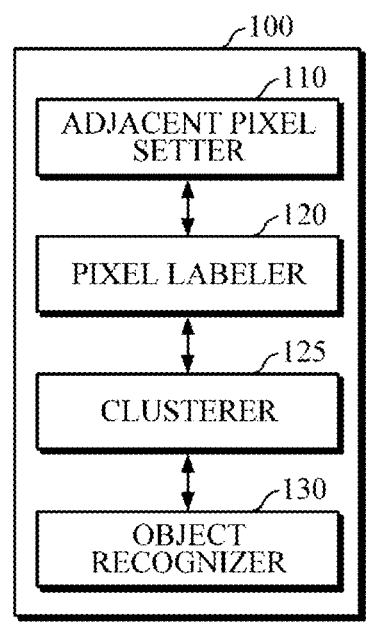
FIG. 1B is a diagram illustrating an example of an object recognition apparatus.

FIGS. 1A and 1B are diagrams illustrating examples of object recognition apparatus. In an example of FIG. 1A, the object recognition apparatus 100 includes an adjacent pixel setter 110, a pixel labeler 120, and an object recognizer 130.

For each pixel in an image frame, the adjacent pixel setter 110 may set a neighboring pixel pair consisting of a first pixel and a second pixel adjacent to the first pixel. In an example, the first pixel refers to a seed pixel, and any pixel in an image frame can be designated as a first pixel. The second pixel refers to a pixel adjacent to the first pixel, and the adjacent pixel setter 110 may set the first and second pixels as a pair.

For example, if pixels within a 3×3 region of one first pixel are set as adjacent pixels around the first pixel, there would be 8 second pixels that are adjacent to the first pixel, i.e., the second pixels are 8 pixel neighbors around the first pixel. Thus, 8 neighboring pixel pairs are formed by the first pixel and each of the 8 second pixels. Other forms and shapes of determining the region of adjacent pixels are considered to be well within the scope of the present disclosure. In an example, the region of adjacent pixels is determined in advance in a variety of forms and shapes, such as, for example the vertically and horizontally neighboring 4 pixels, pixels within a 5×5 region of the seed pixel, and pixels forming a diamond centered at the seed pixel.

According to a degree of proximity between each pixel and the seed pixel set as a constant, 'k', the adjacent pixel setter 110 sets a neighboring pixel pair on the k-layer. In an example, the degree of proximity k is a constant, and the adjacent pixel setter 110 determines the value of k by detecting whether a pixel is close to a seed pixel, as well as by detecting whether a pixel is close to a pixel neighboring the seed pixel. According to the proximity between the seed pixel and other adjacent pixels, the adjacent pixel setter 110 sets the value of k, the required layers, and the region of adjacent pixels.

In an example, if k is set to be 2 degrees, the adjacent pixel setter 110 sets a neighboring pixel pair on a first layer, including the seed pixel the second pixel adjacent to the seed pixel, and sets a neighboring pixel pair on a second layer, including a second pixel and a third pixel neighboring the second pixel. The setting of neighboring pixel pairs will be further described with reference to FIG. 5.

The object recognition apparatus 100 increases the accuracy of recognition by setting an adequate region of adjacent pixels. In addition, a neighboring pixel pair on the k-layer increases the accuracy of the labeling of each adjacent pixel, as well as the accuracy of the labeling of the seed pixel.

The region of adjacent pixels and a method for setting layers may vary, and hence the present description may not be construed to be limited to the above embodiments.

The pixel labeler 120 labels the first pixel using a deep neural network-based model, by taking into account a probability density value of the neighboring pixel pair. In an example, the pixel labeler 120 may label every pixel in the image frame.

In an example, the pixel labeler 120 uses a deep neural network-based model to output a probability density from time information and spatial information to classify each pixel. The time information and spatial information have been input to the object recognition apparatus 100.

Here, the deep neural network-based model is a model such as, for example, Convolutional Neural Network (CNN) model, Deep Convolutional Neural Network (DCNN) model, Recurrent Neural Network (RNN) model, and Recurrent Deep Neural Network (RDNN) model. The pixel labeler 120 uses at least one of the deep neural network-based models or combination of two or more of them.

In one example, if image frames are continuously input from devices, such as, for example, a camera, or a sensor to the object recognition apparatus 100, the pixel labeler 120 may calculate probability density function values from the spatial information of the image frames using a CNN model. In one example, the object recognition apparatus 100 calculates a probability density function value of a current frame among the continuously incoming image frames using an RDNN model and a probability density function value of a previous image. The pixel labeler 120 may label each pixel according to the probability density function value calculated using the deep neural network-based model.

In another example, the pixel labeler 120 labels the first pixel by taking into consideration the probability density function values of the neighboring pixel pairs. The pixel labeler 120 may take into consideration the influence of the second pixel to the first pixel when calculating the probability density function value of the first pixel.

If the probability density of the seed pixel (the first pixel) is similar to that of an adjacent pixel (the second pixel) neighboring the seed pixel, the seed pixel is more likely to be labeled the same as the adjacent pixels. If the probability density values are different between the seed pixel and the adjacent pixels, the seed and adjacent pixels are highly likely to be labeled differently from each other.

According to an example, the pixel labeler 120 may label the seed pixel (first pixel) using a pair-wise function. In this case, the pair-wise function may indicate a difference in information entropy that occurs when adjacent pixels (second pixels) are used in order to estimate the probability density of each pixel.

In an example, the pixel labeler 120 estimates the probability density of the seed pixel based on the probability density values of adjacent pixels. In addition, the pixel labeler 120 determines the probability density of the seed pixel by adding or subtracting a difference between the estimated probability density of the seed pixel and its measured probability density. The pixel labeler 120 may label the seed pixel according to the determined probability density of the seed pixel and label every pixel in the image frame as a seed pixel.

In this case, the pixel labeler 120 may calculate the pair-wise function by using the Kullback-Leibler divergence (KL-divergence). The KL-divergence is a function used to calculate a difference between two probability distributions, allowing for computation of a difference in information entropy that occurs when sampling is performed using a distribution that approximates an ideal distribution. Given that there are two probability distributions P and Q for two probability variables, the KL-divergence between the two distributions is defined as Equation 1 below.

$$D_{KL}(P\|Q) = \sum_i P(i)\log\frac{P(i)}{Q(i)} \quad (1)$$

Based on Equation 1, the pixel labeler 120 may compute a difference in information entropy between the seed pixel and an adjacent pixel, using the KL-divergence.

In an example, the pixel labeler 120 labels the seed pixel by applying a pair-wise function to each neighboring pixel pair set by the adjacent pixel setter 110. In an example where there are adjacent pixels within the 3×3 region centered at the seed pixel (the first pixel), the pixel labeler 120 may compute a difference in entropy of the 8 neighboring pixel pairs by applying the pair-wise function to the 8 neighboring pixel pairs, sum up the computed differences, and adjust the observation probability density of the seed pixel by adding the computed entropy differences. In an example, the entropy difference of the neighboring pixel pair may be multiplied by a control parameter in consideration of the ratio of the seed pixel and the adjacent pixel. Once the probability density function of the seed pixel has been determined by taking into consideration the difference in entropy of neighboring pixel pairs, the pixel labeler 120 may label the seed pixel accordingly.

According to another example, when the adjacent pixel setter 110 sets a second layer or additional layer, the same process may be repeated for each layer. In an example, a first pixel may be set as an adjacent pixel on the first layer, but it may be set as a seed pixel on a second layer. Further details of this process will be described later with reference to FIG. 5. The pixel labeler 120 may compute a probability density of the second pixel (a seed pixel on the second layer) by taking into consideration the difference in entropy of neighboring pixel pairs on the second layer, and the pixel labeler 120 may compute a probability density of the first pixel (a seed pixel on the first layer) by taking into consideration the difference in entropy of neighboring pixel pairs on the first layer. The first pixel (seed pixel) on the first layer may be indirectly affected by the third pixel on the second layer.

Other methods for a predetermined label interval, a label reference, a label class, and a pixel label according to a probability density, which are used when the pixel labeler 120 labels the pixels are considered to be well within the scope of the present disclosure.

Referring to FIG. 1B, the object recognition apparatus 100 includes a clusterer 125 in addition to the elements 110, 120, and 130 shown in FIG. 1A. In addition to the description of FIG. 1B below, the above descriptions of FIG. 1A, are also applicable to FIG. 1B, and are incorporated herein by reference. Thus, the above description may not be repeated here The clusterer 125 may cluster the first pixels with the same label into the same group. In an example, the clusterer 125 represent a group of the first pixels with the same label as one clustered box, and there may be a plurality of clustered boxes in one frame. The clustered box may be recognized as a boundary between different objects.

In an example, the object recognizer 130 recognizes an object based on the labeled first pixels. The object recognizer 130 may recognize an object by each of the clustered boxes into which the first pixels with the same label are clustered by the clusterer 125.

If the pixel labeler 120 performs labeling on a pixel-by-pixel basis, the object recognizer 130 can recognize one or more objects such as, for example, a person, an item, a vehicle, an animal, a dog, and a cup, through labeling on an image-by-image basis.

Figure 2:
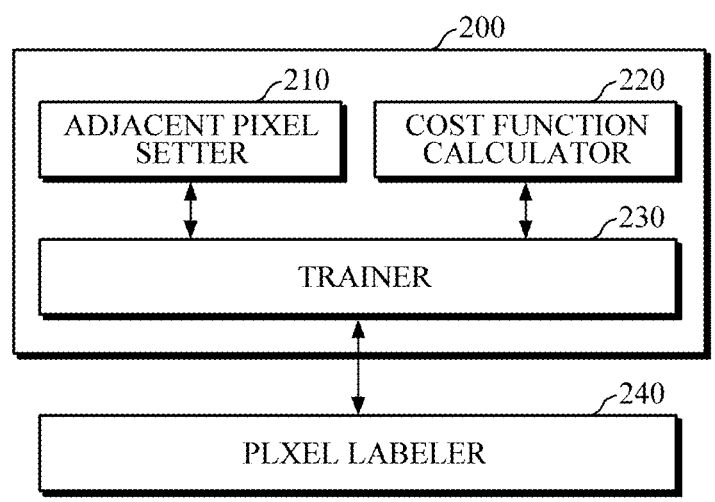
FIG. 2 is a diagram illustrating an example of an object recognition model training apparatus.

FIG. 2 is a diagram illustrating an example of an object recognition model training apparatus according to an example. Referring to FIG. 2, the object recognition model training apparatus 200 includes an adjacent pixel setter 210, a pixel labeler 240, a cost function calculator 220, and a trainer 230. In addition to the description of FIG. 2 below, the above descriptions of FIGS. 1A-1B, are also applicable to FIG. 2, and are incorporated herein by reference. The adjacent pixel setter 210 and the pixel labeler 240 are similar to the adjacent pixel setter 110 and the pixel labeler 120, respectively, shown in FIGS. 1A and 1B, and the above description may not be repeated here.

The adjacent pixel setter 210 may set a neighboring pixel pair consisting of a first pixel and a second pixel adjacent to the first pixel, with respect to each pixel in an image frame. In an example, the adjacent pixel setter 210 determines a layer and a region of adjacent pixels according to a degree of proximity, k (a constant). In an example, if the adjacent pixel setter 210 sets pixels within a 3×3 region from a first pixel (seed pixel) as adjacent pixels, there will be 8 second pixels (adjacent pixels) neighboring the first pixel, and there will be 8 neighboring pixel pairs formed by the first pixel and each of the 8 second pixels. In addition, the adjacent pixel setter 210 may set a neighboring pixel pair on the k-layer according to a degree of proximity, k (a constant), between each pixel and the seed pixel.

The recognition model training apparatus 200 includes a pixel labeler 240. The pixel labeler 240 labels the first pixel using the deep neural network-based model by taking into consideration the probability density of the neighboring pixel pair. In an example, the pair-wise function indicates a difference in entropy between pixels in the neighboring pixel pair that occurs when the second pixel is used to estimate a probability density of the first pixel. The pixel labeler may calculate a pair-wise function using KL-divergence.

Once each pixel in the image frame has been labeled, the cost function calculator 220 may calculate a cost function using the difference in entropy between the first pixel and the neighboring pixel pair. In an example, the cost function may indicate a difference between a label of the first pixel and a ground truth label. The ground truth label is data that is related to the actual label of each pixel that is to be labeled using the deep neural network-based model; the ground truth label serves as a standard to gauge the accuracy of labeling. The deep neural network-based model produces a probability density function to be used to label each pixel, and labels each pixel with a class of the highest probability. The cost function calculator 220 calculates a difference between the label of the first pixel and the ground truth label to obtain an index that represents the accuracy of the label of the first pixel that is chosen by the pixel labeler. If the cost function is minimized, the first pixel's label may become the same as the ground truth label. In an example, the trainer 230 trains a deep neural network-based recognition model in such a way that the cost function can be minimized.

The cost function calculator 220 calculates a cost function by summing up the entropy of an observation probability of the first pixel and the pair-wise function. The first pixel is a pixel that is defined in relation to the neighboring pixel (a second pixel); and the adjacent pixel setter 110 may set a first pixel for each pixel in an image frame. With respect to each pixel, the cost function calculator 220 sums up the entropy of an observation probability of the first pixel and the pair-wise function, and perform the calculation for the entire pixels in the image frame to compute a cost function for the entire image frame. The cost function E may be defined by Equation 2 as below:

$$E = \sum_{i} \left\{ -\log P_i(x = l_i) + \lambda \sum_{j \in N_i} L(i, j) \right\} \quad (2)$$

The cost function may be referred as an error function that quantitatively represents an error between the first pixel's label and the ground truth label. Here, 1) $P_i(x=l_i)$ represents an observation probability when the label of pixel i is the same as the ground truth label $l_i$ ($x \in \{0, \ldots, 11\}$). 2) $N_i$ represents 8 neighboring pixels around pixel i. 3) $\lambda$ is the ratio control parameter between the observation probability of the first pixel and pair-wise function. 4) The pair-wise function L(i,j) may be calculated using KL-divergence. For example, the pair-wise function L(i,j) may be calculated using $\alpha$-$D_{KL}(P_i \| P_j)$. In an example, as per the KL-divergent, the cost function calculator 220 may apply Equation 3 to the pair-wise function.

$$D_{KL}(P \| Q) = H(P, Q) - H(P) \quad (3)$$

When the cost function calculator 220 applies Equation 3 to the pair-wise function, the resulting pair-wise function may be expressed as Equation 4 below:

$$L(i, j) = \begin{cases} CE(P_i, P_j) = E_{P_i}[-\log P_j] = H(P_i) + D_{KL}(P_i\|P_j) = \\ \quad -\sum_{l=1}^{12} P_i(x=l)\log P_j(x=l), & \text{iff } l = l_i = l_j. \\ \max(0, \alpha - D_{KL}(P_i\|P_j)) = \\ \quad \max\left(0, \alpha - \sum_{l=1}^{12} P_i(x=l)\log \frac{P_i(x=l)}{P_j(x=l)}\right), & \text{iff } l_i \neq l_j, \alpha > 0. \end{cases} \quad (4)$$

When the label of pixel i (first pixel) is the same as the label of pixel j ($l=l_i=l_j$), the cost function calculator 220 may define the pair-wise function as the cross entropy (CE) of the first pixel and the second pixel.

When the label of pixel i (first pixel) is not the same as the label of pixel j ($l_i \neq l_j$), the cost function calculator 220 may define the pair-wise function as 0 or the maximum value (max function) of $\alpha - D_{KL}(P_i\|P_j)$. In an example, where the value of $\alpha - D_{KL}(P_i\|P_j)$ is smaller than 0, it is possible to surmise that the minimum value of the pair-wise function is 0. $\alpha$ is a constant that can be determined depending on observation or training, and the pair-wise function can be computed using KL-divergence by Equation 4.

FIG. 4 is a table showing a calculation of a cost function according to an example. Referring to FIG. 4, derivatives ΔE of a cost function are presented, one for the case where the label of pixel i (first pixel) is the same as the label of pixel j (second pixel) and the other for the case where the labels of the two pixels are different from each other.

Referring to FIG. 4, when the label of pixel i is the same as the label of pixel j ($l_i=l_j$), there is no sub-case (N/A, Not Available), and the derivative of the cost function is $$\Sigma_i[-1+P_i(x=l_i)-\lambda P_i(x=l_i)\{1-P_i(x=l_i)\}\Sigma_{j\in N_i} \log P_j(x=l_i)].$$

When the label of pixel i is not the same as the label of pixel j ($l_i \neq l_j$), when $\alpha > D_{KL}(P_i\|P_j)$, the derivative of the cost function is $$\sum_i \left[-1 + P_i(x=l_i) + \lambda\left[\sum_{j\in N_i}\left\{-\log\left(\frac{P_i(x=l_i)}{P_j(x=l_i)}\right)+1\right\}\right]P_i(x=l_i)\{1-P_i(x=l_i)\}\right].$$

Meanwhile, when $\alpha \leq D_{KL}(P_i\|P_j)$, the derivative of the cost function is expressed as $-1+P_i(x=l_i)$.

The trainer 230 trains the deep neural network-based recognition model based on the computed cost function. According to one example, the trainer 230 trains the deep neural network-based model in such a way that the cost function can be minimized. The trainer 230 may set parameters that minimize the cost function, and train the deep neural network-based model using the set parameters. In this case, the trainer 230 may designate the parameters as weights of the model.

If the cost function is 0 or merely a certain difference lying within the probability density interval, it can be deemed that the label of a particular pixel chosen by the pixel labeler 120 is the same as the ground truth label.

In an example, where the label of the first pixel (seed pixel) is the same as the label of the second pixel (adjacent pixel), the trainer 230 may train the model so that the probability density of the first pixel is similar to the probability density of the second pixel. At this time, the trainer 230 may train the deep neural network-based model by setting as a constrain, that the probability density of the first pixel is similar to the probability density of the second pixel. In this case, the trainer 230 may train the deep neural network-based model so that marginal probabilities output from the model are similar to each other.

In addition, in the case where the label of the first pixel (seed pixel) is not the same as the label of the second pixel (adjacent pixel), the trainer 230 may train the model such that a difference between the probability density of the first pixel and the probability density of the second pixel becomes greater. In this case, the trainer 230 may train the model in such a manner that the output marginal probabilities differ between the first pixel and the second pixel.

The aforesaid embodiments are related to learning methods of the pixel labeler 120, and the learning method of the object recognizer 130. The learning methods may be implemented by various machine learning detection algorithms including the existing deep learning algorithm to find a bounding box. The machine learning algorithm may be an algorithm such as, for example, a neural network algorithm, a decision tree, a generic algorithm (GA), a genetic programming (GP), Gaussian process regression, linear discriminant analysis, k-nearest neighbor (K-NN) algorithm, the perceptron, a radial basis function network, a support vector machine (SVM), and deep learning.

Figure 3:
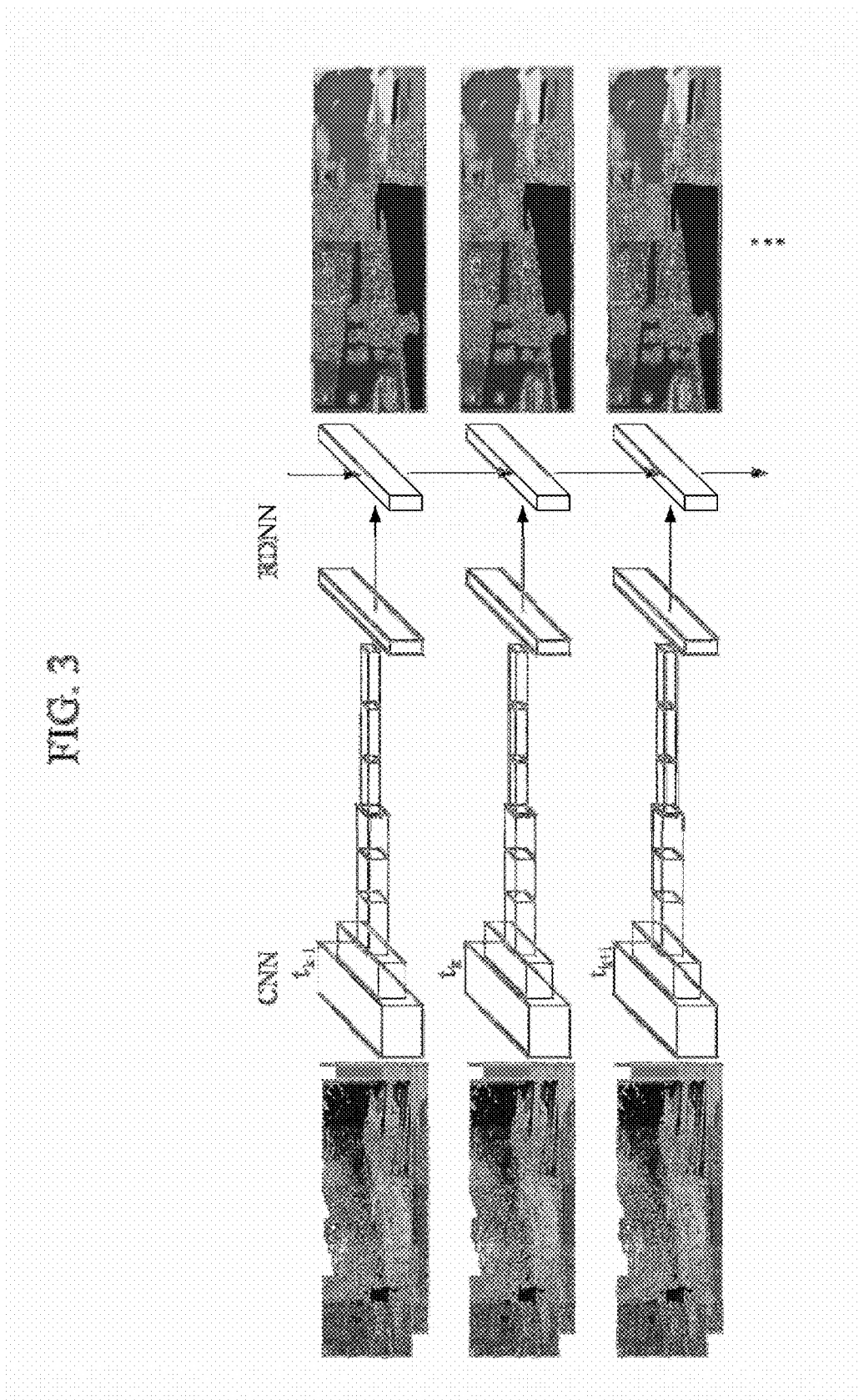
FIG. 3 is a diagram illustrating an example of recognition of an object using the object recognition apparatus.

FIG. 3 is a diagram illustrating an example of recognition of an object using the object recognition apparatus. In an example, the object recognition apparatus 100 recognizes an object using a deep neural network-based model. The deep neural network-based model is based on both a CNN model that uses spatial information and on a RDNN model that uses time information. Hence, it is possible to use the spatial information and time information in object recognition.

Referring to FIG. 3, in an example, the object recognition apparatus 100 uses the CNN-based model to recognize an object in an image frame captured by a camera, and uses the RDNN model to apply the result of recognition of a previous image frame to the object recognition in the current frame. In FIG. 3, the left-hand pictures were captured at different times, and the RDNN model may calculate the sum of image frames at time instances $t_{k-1}$, $t_k$, and $t_{k+1}$ and perform object recognition.

FIG. 5 is a diagram illustrating an example of a neighboring pixel pair and layers. The example shown in FIG. 5 will be described with reference to the object recognition apparatus 100 of FIG. 1 and the model training apparatus 200 of FIG. 2.

Each pixel in an image frame may be either a seed pixel or an adjacent pixel. Depending on a seed pixel, adjacent pixels are determined, and the adjacent pixel setter 110 and 210 may set layers and the region of adjacent pixels.

Referring to FIG. 5, when the seed pixel (first pixel) is set as i(1, 1), pixels within a 3×3 region from pixel i may be set as adjacent pixels (second pixels) of the seed pixel. The adjacent pixels (second pixels) are i(2,1), i(2,2), i(2,3), i(2,4), i(2,5), i(2,6), i(2,7), and i(2,8). Here, the adjacent pixel setter 110 and 210 may create adjacent pixel pairs on the first layer (layer 1) consisting of the seed pixel and each of the 8 second pixels. At this time, there may be 8 neighboring pixel pairs, {i(1,1), i(2,1)}, {i(1,1), i(2,2)}, {i(1,1), i(2,3)}, {i(1,1), i(2,4)}, {i(1,1), i(2,5)}, {i(1,1), i(2,6)}, {i(1,1), i(2,7)}, and {i(1,1), i(2,8)}.

The adjacent pixel setter 110 and 210 may create neighboring pixel pairs on the second layer (layer 2). Referring to FIG. 5, the adjacent pixel i(2,1) on the first layer may become a seed pixel $j_{\{i(1,1),1\}}$ on the second layer. The adjacent pixel setter 110 and 210 may create neighboring pixel pairs on the second layer consisting of the seed pixel $j_{\{i(1,1),1\}}$ and each of adjacent pixels (third pixels) which are pixels within a 3×3 region from said seed pixel $j_{\{i(1,1),1\}}$ on the second layer. Here, there are 8 third pixels, $j_{\{i(2,1),1\}}$, $j_{\{i(2,1),2\}}$, $j_{\{i(2,1),3\}}$, $j_{\{i(2,1),4\}}$, $j_{\{i(2,1),5\}}$, $j_{\{i(2,1),6\}}$, $j_{\{i(2,1),7\}}$, and $j_{\{i(2,1),8\}}$. In this case, there may be 8 neighboring pixel pairs consisting of one seed pixel (second pixel) $j_{\{i(1,1),1\}}$ and each of the 8 third pixels.

On the second layer, pixel i(1,1), i.e., the seed pixel (first pixel) on the first layer, and the eight 8 second pixels, i.e., adjacent pixels around the first pixel, adjacent to 8 third pixels on the second layer. Each of the second pixels is adjacent to 8 third pixels on the second layer, and hence there are 8*8=64 neighboring pixel pairs on the second layer. Here, the third pixels on the second layer are used to compute a probability density of their seed pixel, i.e., the second pixel, and once the value for each second pixel has been computed, the second pixels may be used to compute a probability density of the first pixel.

Figure 6:
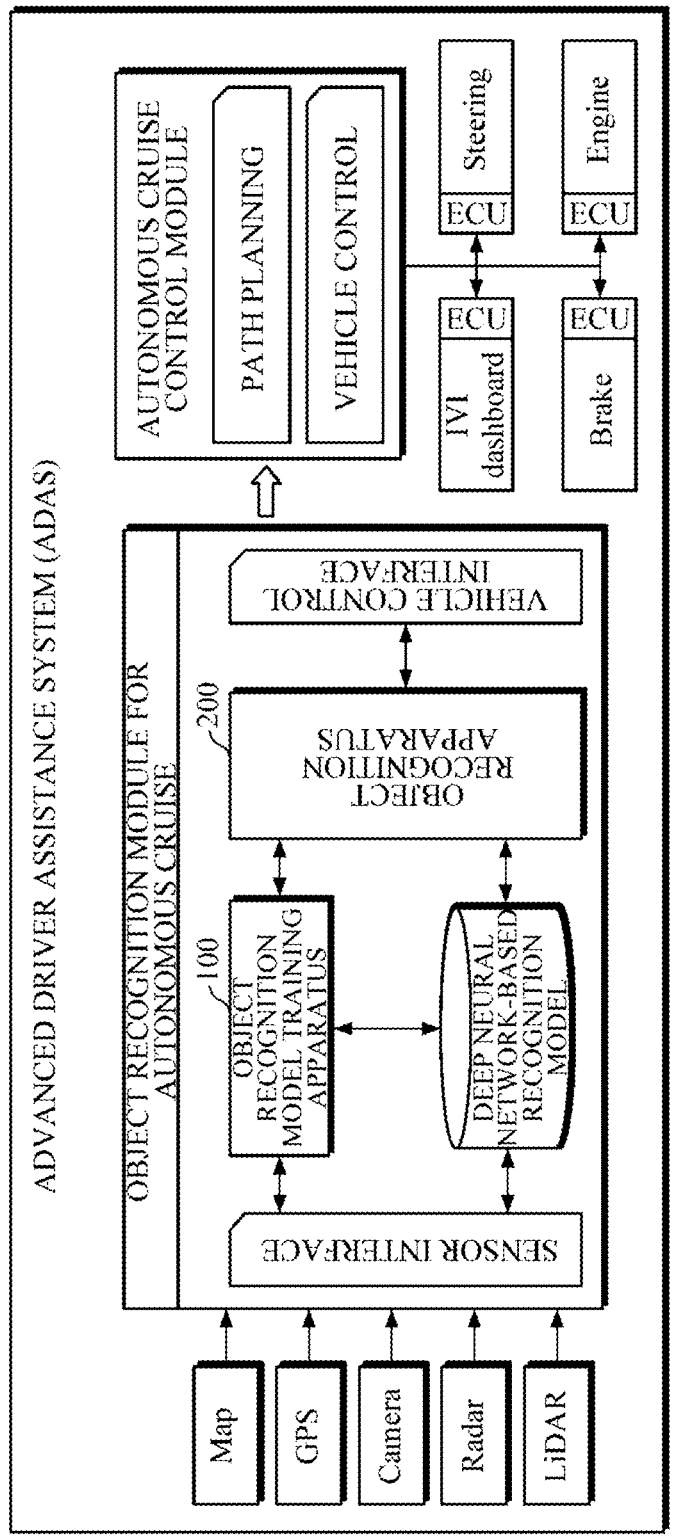
FIG. 6 is a diagram illustrating an example of the application of the objection recognition model training apparatus and the object recognition apparatus to an advanced driver assistance system (ADAS).

FIG. 6 is a diagram illustrating an example of the application of the objection recognition model training apparatus and the object recognition apparatus to an advanced driver assistance system (ADAS). According to one example, the object recognition apparatus 200 and the object recognition model training apparatus 100 recognizes objects from image frames captured by a camera equipped on a driving vehicle and transmit the recognition result to an autonomous cruise control module to perform tasks, such as, for example, path planning and vehicle control.

Referring to FIG. 6, in an example, the autonomous cruise control module includes a sensor interface, the object recognition model training apparatus 200, a deep neural network-based recognition model, the object recognition apparatus 100, and a vehicle control interface.

The sensor interface may receive information from various sensors such as, for example, a map, a GPS, a camera or a sensor. In an example, the camera is a mono-visible camera (CCD and CMOS), a stereo vision camera, a near-infrared camera, or a far-infrared camera, and the sensor may be a radar sensor or Lidar. The received information may be recognized as an object by the object recognition apparatus 200 through the deep neural network-based recognition model. In an example, combinations of various types of cameras and sensors may be used to provide time information and spatial information to an object recognition module for autonomous cruise. In addition, a plurality of cameras and sensors may be equipped in the system.

The object recognition apparatus 100 may recognize an object based on the time information and the spatial information input through the deep neural network-based recognition model. Once the object recognition is complete, the vehicle control interface may transmit information necessary for vehicle control to the autonomous cruise control model. The autonomous cruise control module may be used to carry out tasks, such as, for example, path planning, vehicle control, and the like.

In addition to the aforesaid embodiments, the object recognition apparatus and the object recognition model training apparatus may be used in various applications for object recognition. For example, the object recognition apparatus 100 and the object recognition model training apparatus 200 may be embedded in or interoperate with various digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be may be embedded in or interoperate with a smart appliance, an intelligent vehicle, an electric vehicle, a hybrid vehicle, a smart home environment, or a smart building environment.

Figure 7:
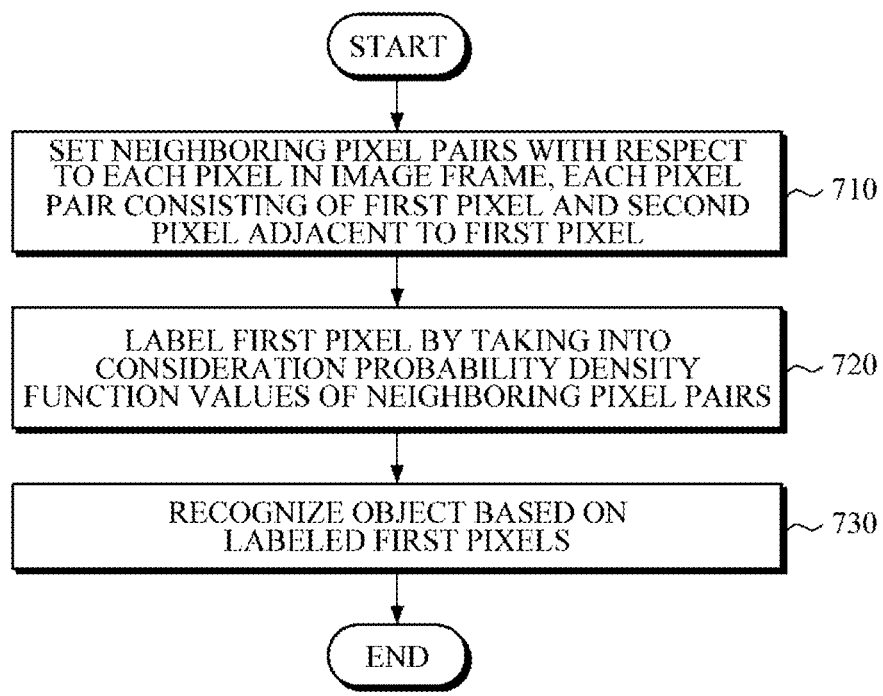
FIG. 7 is a diagram illustrating an example of an object recognition method using the object recognition apparatus shown in FIGS. 1A and 1B.

FIG. 7 is a diagram illustrating an object recognition method using the object recognition apparatus shown in FIGS. 1A and 1B. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. In addition to the description of FIG. 7 below, the above descriptions of FIGS. 1-6, are also applicable to FIG. 7, and are incorporated herein by reference. Thus, the above description may not be repeated here.

In 710, with respect to each pixel in an input image, the adjacent pixel setter 110 sets neighboring pixel pairs consisting of a first pixel and a second pixel that is adjacent to the first pixel. If pixels within a 3×3 region from one first pixel are set as adjacent pixels around the first pixel, there will be 8 second pixels that are adjacent to the first pixel. That is, the second pixels are 8 pixel neighbors around the first pixel, and there will be 8 neighboring pixel pairs formed by the first pixel and each of the 8 second pixels.

In an example, the region of adjacent pixels may be determined in advance in a variety of forms and shapes, such as, for example, the vertically and horizontally neighboring 4 pixels, pixels within a 5×5 region from the seed pixel, and pixels forming a diamond centered at the seed pixel.

According to a degree of proximity between each pixel and the seed pixel set as a constant, 'k', the adjacent pixel setter 110 sets a neighboring pixel pair on the k-layer. In an example, the degree of proximity k is an arbitrary constant, and the adjacent pixel setter 110 determines the value of k by detecting whether a pixel is close to a seed pixel, as well as by detecting whether a pixel is close to a pixel neighboring the seed pixel. According to the proximity between the seed pixel and other adjacent pixels, the adjacent pixel setter 110 sets the value of k, the required layers, and the region of adjacent pixels.

In an example, if k is set to be 2 degrees, the adjacent pixel setter 110 sets a neighboring pixel pair on a first layer, including the seed pixel the second pixel adjacent to the seed pixel, and sets a neighboring pixel pair on a second layer, including a second pixel and a third pixel neighboring the second pixel.

In 720, the pixel labeler 120 labels the first pixel by taking into consideration the probability density values of the neighboring pixel pairs. According to the example, the pixel labeler 120 labels every pixel in the image frame. The pixel labeler 120 may use a deep neural network-based model to output a probability density from time information and spatial information which are input to the object recognition apparatus 100, in order to classify each pixel.

The deep neural network-based model is a model, such as, for example, a Convolutional Neural Network (CNN) model, a Deep Convolutional Neural Network (DCNN) model, a Recurrent Neural Network (RNN) model, a Recurrent Deep Neural Network (RDNN) model. The pixel labeler 120 uses at least one of the deep neural network-based models or the combination of two or more of them. If a probability density of the seed pixel (the first pixel) is similar to that of an adjacent pixel (the second pixel) neighboring the seed pixel, the seed pixel is more likely to be labeled the same as the adjacent pixels. If the probability density values are different between the seed pixel and the adjacent pixels, the seed and adjacent pixels are highly likely to be labeled differently from each other.

According to one example, the pixel labeler 120 may label the seed pixel (first pixel) using a pair-wise function. In an example, the pair-wise function indicates a difference in information entropy that occurs when adjacent pixels (second pixels) are used in order to estimate a probability density of each pixel.

The pixel labeler 120 estimates a probability density of the seed pixel based on probability density values of the adjacent pixels. In addition, the pixel labeler 120 may determine the probability density of the seed pixel by adding or subtracting a difference between the probability density estimate of the seed pixel and a measured probability density of the seed pixel. The pixel labeler 120 may label the seed pixel according to the determined probability density of the seed pixel and label every pixel in the image frame as a seed pixel.

In an example, the pixel labeler 120 may calculate the pair-wise function using the KL-divergence. The KL-divergence is a function used to calculate a difference between two probability distributions, allowing for computation of a difference in information entropy that may occur when sampling is performed using a distribution that approximates an ideal distribution.

In an example, the pixel labeler 120 labels the seed pixel by applying a pair-wise function to each neighboring pixel pair which is set by the adjacent pixel setter 110. Where there are adjacent pixels within the 3×3 region centered at the seed pixel (the first pixel), the pixel labeler 120 may compute a difference in entropy of the 8 neighboring pixel pairs by applying the pair-wise function to the 8 neighboring pixel pairs, sum up the computed differences, and adjust the observation probability density of the seed pixel by adding the computed entropy differences. In an example, the entropy difference of the neighboring pixel pair is multiplied by a control parameter in consideration of the ratio of the seed pixel and the adjacent pixel. Once the probability density function of the seed pixel has been determined by taking into consideration the difference in entropy of neighboring pixel pairs, the pixel labeler 120 may label the seed pixel accordingly.

According to another example, when the adjacent pixel setter 110 sets a 2 or greater-order layer, the same process is repeated for each layer. In other words, an adjacent pixel is determined relative to a seed pixel, for example, a second pixel may be defined as an adjacent pixel of the first pixel on the first layer, but it may be set as a seed pixel on a second layer.

The pixel labeler 120 may compute a probability density of the second pixel (a seed pixel on the second layer) by taking into consideration the difference in entropy of neighboring pixel pairs on the second layer, and the pixel labeler 120 may compute a probability density of the first pixel (a seed pixel on the first layer) by taking into consideration the difference in entropy of neighboring pixel pairs on the first layer. The first pixel (seed pixel) on the first layer may be indirectly affected by the third pixel on the second layer.

Other method for a predetermined label interval, a label reference, a label class, and a pixel label according to a probability density, which are used when the pixel labeler 120 labels the pixels are considered to be well within the scope of the present disclosure.

The clusterer 125 may cluster the first pixels with the same label into the same group. In this case, the clusterer 125 may represent a group of the first pixels with the same label as one clustered box, and there may be a plurality of clustered boxes in one frame. The clustered box may be recognized as a boundary between different objects.

In 730, the object recognizer 130 may recognize an object based on the labeled first pixels. When the pixel labeler 120 has finished labelling a seed pixel (first pixel) for each frame in the image, the object recognizer 130 may recognize the first pixels labeled with the same label as the object of the same class. When the clusterer 125 has clustered the first pixels with the same label into boxes, the object recognizer 130 may recognize an object by each of the clustered boxes.

If the pixel labeler 120 performs labeling on a pixel-by-pixel basis, the object recognizer 130 can recognize one or more objects such as, for example, a person, an item, a vehicle, an animal, a dog, and a cup through labeling on an image-by-image basis.

Figure 8:
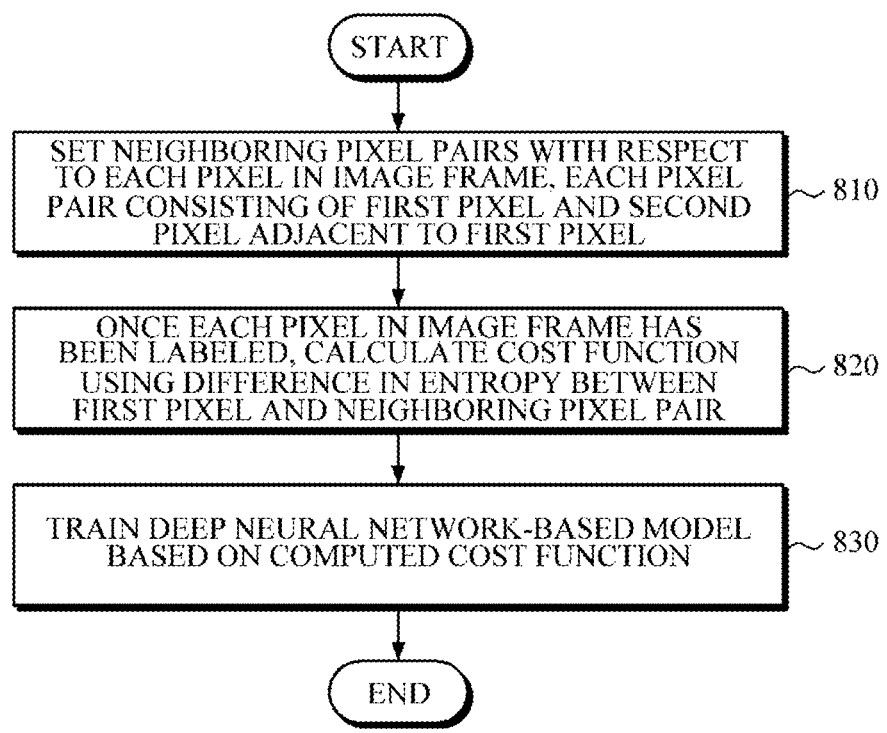
FIG. 8 is a diagram illustrating an example of a recognition model training method using the object recognition model training apparatus of FIG. 2.

FIG. 8 is a diagram illustrating a recognition model training method using the object recognition model training apparatus of FIG. 2. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. In addition to the description of FIG. 8 below, the above descriptions of FIGS. 1-7, are also applicable to FIG. 8, and are incorporated herein by reference. Thus, the above description may not be repeated here.

In 810, the adjacent pixel setter 210 sets a neighboring pixel pair consisting of a first pixel and a second pixel adjacent to the first pixel, with respect to each pixel in an image frame. The adjacent pixel setter 210 may determine a layer and a region of adjacent pixels according to a degree of proximity, k (a constant). In an example, if the adjacent pixel setter 210 sets pixels within a 3×3 region centered at a first pixel (seed pixel) as adjacent pixels, there will be 8 second pixels (adjacent pixels) neighboring the first pixel, and there will be 8 neighboring pixel pairs formed by the first pixel and each of the 8 second pixels. In another example, the adjacent pixel setter 210 may set a neighboring pixel pair on the k-layer according to a degree of proximity, k (a constant), between each pixel and the seed pixel.

The pixel labeler 120 may label the first pixel using a deep neural network-based model, by taking into consideration a probability density of the neighboring pixel pair. In an example, the pair-wise function may indicate a difference in information entropy that occurs when adjacent pixels (second pixels) are used in order to estimate a probability density of each pixel. The pixel labeler 240 may calculate a pair-wise function using KL-divergence.

In 820, once each pixel in the image frame has been labeled, the cost function calculator 220 calculates a cost function using the difference in entropy between the first pixel and the neighboring pixel pair. The cost function indicates a difference between a label of the first pixel and a ground truth label. The ground truth label may be an ideal outcome or a goal of the deep neural network-based model. If the cost function is minimized, the first pixel's label may become the same as the ground truth label. In an example, the trainer 230 may train a deep neural network-based recognition model in such a way that the cost function can be minimized.

According to one example, the cost function calculator 220 may calculate a cost function by summing up entropy of an observation probability of the first pixel and the pair-wise function. In an example, the first pixel is a pixel that is defined in relation to the neighboring pixel (a second pixel), the adjacent pixel setter 110 sets a first pixel for each pixel in an image frame. With respect to each pixel, the cost function calculator 220 sums up the entropy of an observation probability of the first pixel and the pair-wise function, and perform the calculation for the entire pixels in the image frame to compute a cost function for the entire image frame. The cost function E may be defined by Equation 2 as below:

$$E = \sum_i \left\{ -\log P_i(x = l_i) + \lambda \sum_{j \in N_i} L(i, j) \right\} \quad (2)$$

The cost function may indicate a difference between the label of the first pixel and the ground truth label, and hence it may also be called an error function. Here, 1) $P_i(x=l_i)$ represents an observation probability when the label of pixel i is the same as the ground truth label $l_i(x \in \{0, \ldots, 11\})$. 2) $N_i$ represents 8 neighboring pixels around pixel i. 3) $\lambda$ is the ratio control parameter between the observation probability of the first pixel and a pair-wise function. 4) The pair-wise function L(i,j) may be calculated using KL-divergence. For example, the pair-wise function L(i,j) may be calculated using $\alpha - D_{KL}(P_i \| P_j)$. In an example, as per the KL-divergent, the cost function calculator 220 may apply Equation 3 as below to the pair-wise function.

$$D_{KL}(P \| Q) = H(P, Q) - H(P) \quad (3)$$

When the cost function calculator 220 applies Equation 3 to the pair-wise function, the resulting pair-wise function may be expressed as Equation 4 below:

$$(v) L(i, j) = \quad (4)$$

$$\begin{cases} CE(P_i, P_j) = E_{P_i}[-\log P_j] = H(P_i) + D_{KL}(P_i \| P_j) = \\ \quad -\sum_{l=1}^{12} P_i(x = l) \log P_j(x = l), & \text{iff } l = l_i = l_j. \\ \max(0, \alpha - D_{KL}(P_i \| P_j)) = \\ \quad \max\left(0, \alpha - \sum_{l=1}^{12} P_i(x = l) \log \frac{P_i(x = l)}{P_j(x = l)}\right), & \text{iff } l_i \neq l_j, \alpha > 0. \end{cases}$$

When the label of pixel i (first pixel) is the same as the label of pixel j ($l=l_i=l_j$), the cost function calculator 220 may define the pair-wise function as the cross entropy (CE) of the first pixel and the second pixel.

Also, When the label of pixel i (first pixel) is not the same as the label of pixel j ($l_i \neq l_j$), the cost function calculator 220 may define the pair-wise function as 0 or the maximum value (max function) of $\alpha - D_{KL}(P_i \| P_j)$. In an example where the calculation of $\alpha - D_{KL}(P_i \| P_j)$ is smaller than 0, it is possible to surmise that the minimum value of the pair-wise function is 0. $\alpha$ is a constant that can be determined depending on observation or training, and the pair-wise function can be computed using KL-divergence by Equation 4.

Referring back to FIG. 4, in the case where the label of pixel i is the same as the label of pixel j ($l_i=l_j$), there is no sub-case (N/A, Not Available) and the derivative of the cost function is $$\Sigma_i[-1+P_i(x=l_i)-\lambda P_i(x=l_i)\{1-P_i(x=l_i)\}\Sigma_{j \in N_i} \log P_i(x=l_i)].$$

In the case where the label of pixel i is not the same as the label of pixel j ($l_i \neq l_j$), when $\alpha - D_{KL}(P_i \| P_j)$, the derivative of the cost function is $$\sum_i \left[ -1 + P_i(x = l_i) + \lambda \left[ \sum_{j \in N_i} \left\{ -\log\left(\frac{P_i(x = l_i)}{P_j(x = l_i)}\right) + 1 \right\} \right] P_i(x = l_i)\{1 - P_i(x = l_i)\} \right].$$

Meanwhile, when $\alpha - D_{KL}(P_i \| P_j)$, the derivative of the cost function is represented as $-1 + P_i(x=l_i)$.

Then, the trainer 230 trains the deep neural network-based model based on the computed cost function, as depicted in 830. According to the example, the trainer 230 may train the deep neural network-based model in such a way that the cost function can be minimized. The trainer 230 may set parameters that minimize the cost function, and train the deep neural network-based model using the set parameters. In this case, the trainer 230 may designate the parameters as weights of the model.

If the cost function is 0 or merely a certain difference lying within the probability density interval, it can be deemed that the label of a particular pixel chosen by the pixel labeler 120 is the same as the ground truth label.

When the label of the first pixel (seed pixel) is the same as the label of the second pixel (adjacent pixel), the trainer 230 may train the model so that the probability density of the first pixel is similar to the probability density of the second pixel. In an example, the trainer 230 trains the deep neural network-based model by setting the fact that the probability density of the first pixel is similar to the probability density of the second pixel as a constrain. In an example, the trainer 230 may train the deep neural network-based model so that marginal probabilities output from the model are similar to each other.

In an example, when the label of the first pixel (seed pixel) is not the same as the label of the second pixel (adjacent pixel), the trainer 230 trains the model such that a difference between the probability density of the first pixel and the probability density of the second pixel becomes greater. In this case, the trainer 230 may train the model in such a manner that output marginal probabilities differ between the first pixel and the second pixel.

The object recognition apparatus 100, object recognition model training apparatus 200, adjacent pixel setter 110, pixel labeler 120, pixel labeler 240, object recognizer 130, clusterer 125, adjacent pixel setter 210, cost function calculator 220, and trainer 230 described in FIGS. 1A, 1B, and 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An object recognition apparatus comprising:
a processor configured to:
set neighboring pixel pairs in an image frame, each neighboring pixel pair comprising a first pixel and one or more second pixels adjacent to the first pixel;
label the first pixel of each of the neighboring pixel pairs in the image frame using a deep neural network-based model based on a probability density function value of the neighboring pixel pairs; and
recognize an object based on the labeled first pixel of each of the neighboring pixel pairs of the image frame.

2. The object recognition apparatus of claim 1, wherein the processor comprises:
an adjacent pixel setter configured to set the neighboring pixel pairs in the image frame, the each neighboring pixel pair comprising the first pixel and the one or more second pixels adjacent to the first pixel;
a labeler configured to label the first pixel of each of the neighboring pixel pairs in the image frame using the deep neural network-based model based on the probability density function value of the neighboring pixel pairs; and
an object recognizer configured to recognize the object based on the labeled first pixel of each of the neighboring pixel pairs in the image frame.

3. The object recognition apparatus of claim 2, wherein the one or more second pixels are 8 pixels adjacent to the first pixel, and the neighboring pixel pairs are 8 pixel pairs, each comprising the first pixel and one of the 8 second pixels.

4. The object recognition apparatus of claim 2, wherein the adjacent pixel setter is further configured to set the neighboring pixel pairs on a k-layer according to a degree of proximity (k) between each pixel and the first pixel.

5. The object recognition apparatus of claim 4, wherein k is a constant.

6. The object recognition apparatus of claim 1, wherein the deep neural network-based model comprises any one or any combination of a convolutional neural network (CNN) model that uses spatial information and a recurrent deep neural network (RDNN) model that uses time information.

7. The object recognition apparatus of claim 2, wherein the pixel labeler is further configured to label the first pixel of each of the neighboring pixel pairs in the image frame using a pair-wise function, and the pair-wise function indicates a difference in entropy between pixels in the neighboring pixel pairs that occurs when a second pixel of the one or more second pixels is used to estimate a probability density function value of the first pixel.

8. The object recognition apparatus of claim 7, wherein the pixel labeler is further configured to calculate the pair-wise function using Kullback-Leibler divergence (KL-divergence).

9. The object recognition apparatus of claim 2, wherein the object recognizer is further configured to recognize first pixels of each of the neighboring pixel pairs in the image frame labeled with a same label as an object of a class.

10. The object recognition apparatus of claim 2, wherein the processor further comprises:
a clusterer configured to cluster first pixels of each of the neighboring pixel pairs in the image frame with a same label into a group, and to represent the group as a cluster box, wherein the cluster box indicates a boundary between different objects.

11. The object recognition apparatus of claim 1, further comprising a memory configured to store instructions, and wherein the processor is further configured to execute the instructions to set the neighboring pixel pairs in the image frame, the each neighboring pixel pair comprising the first pixel of each of the neighboring pixel pairs in the image frame and the one or more second pixels adjacent to the first pixel, label the first pixel of each of the neighboring pixel pairs in the image frame using the deep neural network-based model based on the probability density function value of the neighboring pixel pairs, and recognize the object based on the labeled first pixel of each of the neighboring pixel pairs in the image frame.

12. A processor-implemented object recognition method, the method comprising:
setting neighboring pixel pairs in an image frame, each neighboring pixel pair comprising a first pixel and one or more second pixels adjacent to the first pixel;
labeling the first of each of the neighboring pixel pairs in the image frame using a deep neural network-based model based on a probability density function value of the neighboring pixel pairs; and
recognizing an object based on the labeled first pixel of each of the neighboring pixel pairs in the image frame.

13. The object recognition method of claim 12, wherein the setting of the neighboring pixel pairs comprises setting the neighboring pixel pairs on a k-layer according to a degree of proximity (k) between each pixel and the first pixel.

14. The object recognition method of claim 12, wherein the first pixel is labeled using a pair-wise function, and the pair-wise function indicates a difference in entropy between pixels in the neighboring pixel pairs that occurs when a second pixel of the one or more second pixels is used to estimate a probability density function value of the first pixel of each of the neighboring pixel pairs in the image frame.

15. The object recognition method of claim 14, wherein the labeling of the first pixel of each of the neighboring pixel pairs in the image frame comprises calculating the pair-wise function using Kullback-Leibler divergence (KL-divergence).

* * * * *